United States Patent
Gurusubramanian et al.

(10) Patent No.: US 10,717,443 B2
(45) Date of Patent: Jul. 21, 2020

(54) OCCUPANT AWARENESS MONITORING FOR AUTONOMOUS VEHICLES

(71) Applicant: Rivian IP Holdings, LLC, Plymouth, MI (US)

(72) Inventors: Sabarish Gurusubramanian, San Jose, CA (US); Oliver Jeromin, Ypsilanti, MI (US); Paul Theodosis, Dublin, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 143 days.

(21) Appl. No.: 15/876,766

(22) Filed: Jan. 22, 2018

(65) Prior Publication Data

US 2019/0225228 A1 Jul. 25, 2019

(51) Int. Cl.
| | | |
|---|---|---|
| *B60W 40/08* | (2012.01) | |
| *G06K 9/00* | (2006.01) | |
| *B60W 50/16* | (2020.01) | |
| *G05D 1/00* | (2006.01) | |

(52) U.S. Cl.
CPC .......... *B60W 40/08* (2013.01); *B60W 50/16* (2013.01); *G05D 1/0088* (2013.01); *G06K 9/00845* (2013.01); *B60W 2040/0818* (2013.01)

(58) Field of Classification Search
CPC .......... B60W 40/08; B60W 50/16; B60W 2040/0818; G05D 1/0088; G06K 9/00845
USPC .......................................................... 701/27
See application file for complete search history.

(56) References Cited

U.S. PATENT DOCUMENTS

| | | | | |
|---|---|---|---|---|
| 9,523,984 | B1* | 12/2016 | Herbach | ............ B60W 30/09 |
| 2004/0044293 | A1* | 3/2004 | Burton | ............ A61B 5/18 |
| | | | | 600/544 |
| 2011/0050460 | A1 | 3/2011 | Bruns et al. | |
| 2015/0097864 | A1* | 4/2015 | Alaniz | ............ G06T 7/20 |
| | | | | 345/633 |
| 2015/0100179 | A1* | 4/2015 | Alaniz | ............ A63F 13/00 |
| | | | | 701/1 |
| 2015/0274036 | A1 | 10/2015 | Arad et al. | |
| 2016/0148507 | A1* | 5/2016 | Pittman | ............ H04W 4/029 |
| | | | | 340/917 |

(Continued)

FOREIGN PATENT DOCUMENTS

WO 2015138849 A2 9/2015

OTHER PUBLICATIONS

Patent Cooperation Treaty, International Search Report, PCT/US2019/014169, dated Mar. 28, 2019.

(Continued)

*Primary Examiner* — Muhammad Shafi
(74) *Attorney, Agent, or Firm* — Clements Bernard Walker; Robert R. Richardson; Alistair K. Chan

(57) ABSTRACT

Systems and methods are described for monitoring awareness of a vehicle occupant. An approach may involve connecting, by the vehicle, to a wireless device of the vehicle occupant, receiving, by the vehicle, a signal from the wireless device indicative of activity of the vehicle occupant and processing the signal to determine a level of awareness of the vehicle occupant, determining whether the level of awareness of the vehicle occupant satisfies a threshold, and generating, by the vehicle, an alert based upon whether the level of awareness of the vehicle occupant satisfies the threshold.

20 Claims, 2 Drawing Sheets

(56) References Cited

U.S. PATENT DOCUMENTS

| | | | |
|---|---|---|---|
| 2016/0167486 A1* | 6/2016 | Yang | B60S 1/08 |
| | | | 701/49 |
| 2016/0207454 A1 | 7/2016 | Cuddihy et al. | |
| 2016/0335895 A1* | 11/2016 | Lui | B60R 25/24 |
| 2017/0131715 A1 | 5/2017 | Ryu et al. | |
| 2018/0288232 A1* | 10/2018 | MacNeille | H04M 11/007 |
| 2019/0124477 A1* | 4/2019 | Shipley | G07C 5/008 |

OTHER PUBLICATIONS

Patent Cooperation Treaty, Written Opinion of the International Searching Authority, PCT/US2019/014169, dated Mar. 28, 2019.

* cited by examiner

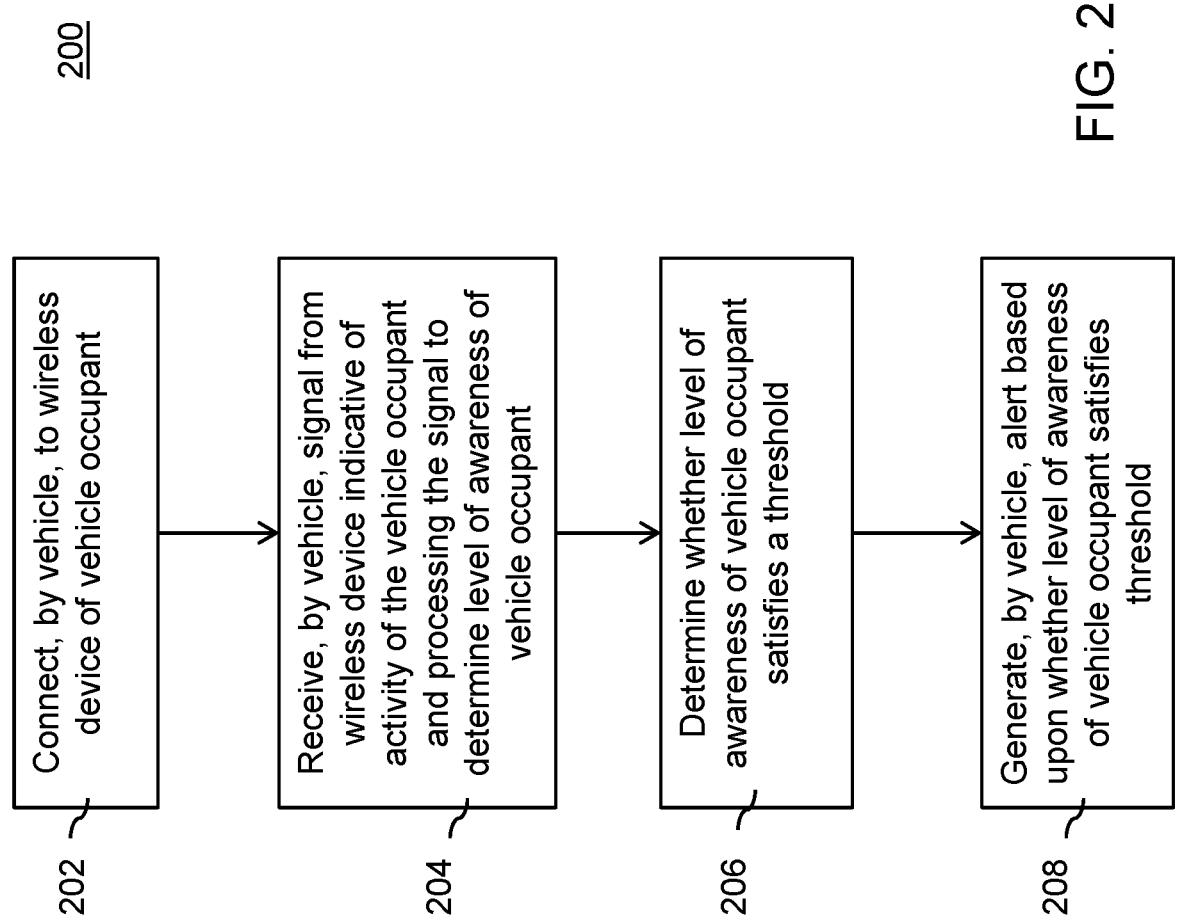

OCCUPANT AWARENESS MONITORING FOR AUTONOMOUS VEHICLES

BACKGROUND

Field of the Disclosure

The present disclosure relates to automotive vehicles, and more particularly to vehicle driver awareness monitoring systems and methods.

Background Information

Depending on a vehicle's level of autonomy, a driver may be required to maintain a specified level of attention to the road so as to control the vehicle appropriately. The Society for Automotive Engineers (SAE) has defined five levels of vehicle autonomy, ranging from level 0 (no automation) to level 5 (full automation), that have been adopted by the U.S. National Highway Traffic Safety Administration. Higher levels allow for less attentiveness from the human driver. For example, when operating a vehicle with autonomy levels 1 and 2 (driver assistance and partial automation, respectively), a driver should be completely attentive at all times because these systems work in parallel with the human driver. When operating a vehicle with level 3 autonomy (conditional automation), the human driver may divert attention from driving but be ready to retake control when the vehicle requests. In a vehicle with level 4 autonomy (high automation), the vehicle is completely capable of driving itself within limitations, such as speed limits or geographical constraints, beyond which a human driver must be ready to retake control. In level 5 autonomy (full automation), the driver may not drive the vehicle at all (and in this respect can be considered a passenger) and can be inattentive, but nonetheless may be required to remain conscious so as to appropriately respond to certain situations. The present inventors have recognized the technological problem of a potential need for human intervention in connection with the operation of autonomous automotive vehicles featuring autonomy levels 3, 4, or 5, and have observed a need for a technological solution to monitor the awareness of vehicle occupants.

SUMMARY

The present inventors have observed a need for systems and methods to monitor the awareness of vehicle occupants, e.g., in automotive vehicles featuring autonomy levels 3, 4 or 5. Exemplary approaches described herein may address such needs.

According to one example, a method of monitoring awareness of a vehicle occupant may include connecting, by the vehicle, to a wireless device of the vehicle occupant, receiving, by the vehicle, a signal from the wireless device indicative of activity of the vehicle occupant and processing the signal to determine a level of awareness of the vehicle occupant, determining whether the level of awareness of the vehicle occupant satisfies a threshold, and generating, by the vehicle, an alert based upon whether the level of awareness of the vehicle occupant satisfies the threshold. A system for carrying out the exemplary approach may include a computer processing system and a memory comprising program instructions, wherein the computer processing system is configured to execute the above-mentioned steps. A non-transitory computer readable medium for carrying out the exemplary approach may comprise program instructions adapted to cause a computer processing system to execute the above-mentioned steps.

BRIEF DESCRIPTION OF THE FIGURES

FIG. 2 illustrates a flow chart of an exemplary approach of monitoring vehicle occupant awareness according to examples of the disclosure.

DETAILED DESCRIPTION OF EXEMPLARY EMBODIMENTS

Figure 1:
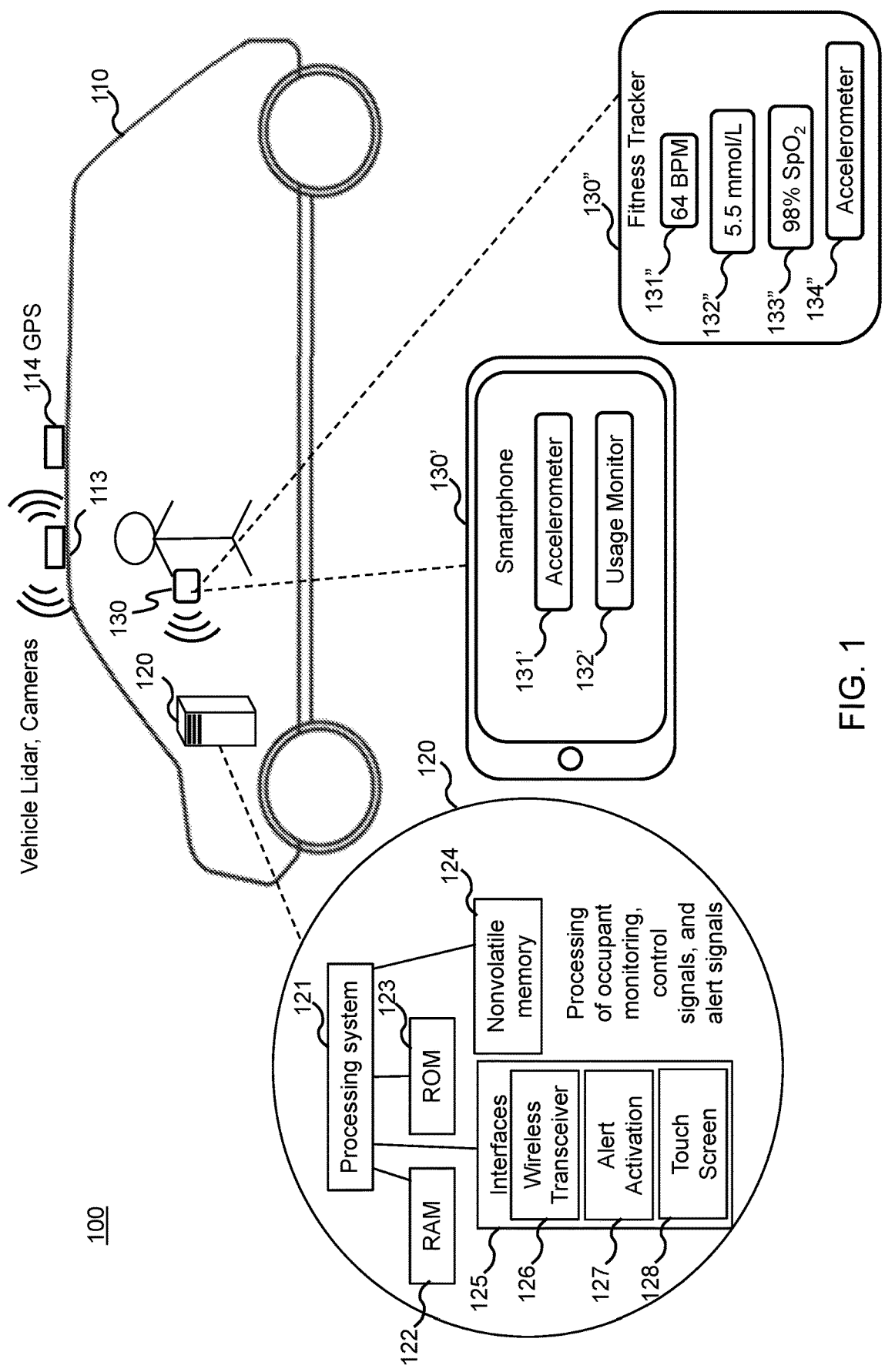
FIG. 1 illustrates an exemplary framework for an approach of monitoring vehicle occupant awareness according to examples of the disclosure.

As described in examples herein, the present systems and methods provide monitoring of a vehicle occupant's awareness so as to improve safety of operation of that vehicle. For example, previously known driver monitoring systems (DMSs) can be used for level 1-2 autonomous vehicles. Such DMSs can use infrared sensors and a camera capable of eye tracking via such infrared sensors to detect whether a driver is paying attention to the road. If the DMS determines that the driver is paying insufficient attention to the road, the DMS can flash a warning and generate sounds to draw the driver's attention; if insufficient action then is taken by the driver, the DMS can cause the vehicle to automatically apply the brakes. In level 3, 4 and level 5 autonomous vehicles, a driver can safely be partially or fully inattentive. However, even if used in such vehicles, a previously known DMS would be inadequate to monitor whether the driver (who may be considered an occupant in a level 5 autonomous vehicle) has an appropriate level of awareness to take control of the vehicle if needed.

As described herein, a vehicle occupant's smartphone and/or fitness monitor and/or other medical monitoring device can be paired with the vehicle, and can send signals to the vehicle that the vehicle can use to monitor the occupant's level of awareness and take appropriate action based thereon. For example, the vehicle can automatically pair to an occupant's smartphone and/or fitness tracker upon the occupant entering the vehicle. The smartphone and/or fitness tracker can send one or more signals to the vehicle that are indicative of activity of the vehicle occupant, from which a level of awareness of the vehicle occupant can be determined by processing the activity data. For example, the smartphone can send one or more signals to the vehicle indicative of the occupant's physical activity and/or electronic usage of the smartphone, and/or the fitness tracker can send one or more signals to the vehicle indicative of one or more of the occupant's physical characteristics that correlate to the occupant's awareness, and such information may be considered to be activity data under the present disclosure. An alert module at the vehicle comprising a computer processor can receive and process the occupant activity data to determine whether the activity data satisfies a threshold to determine whether the vehicle occupant is sufficiently attentive to undertake driving control of the vehicle should the need arise, e.g., due to external factors, such as poor weather conditions, roadway traffic, or other conditions for which the vehicle occupant must assume the primary role as driver. Alternatively, the fitness tracker or medical monitoring device can be paired to the smartphone, and the fitness tracker/monitoring device can send such signals to the smartphone which then can send such signals to the vehicle. Optionally, pairing the smartphone and/or fitness tracker to the vehicle can include installing to the smartphone and/or fitness tracker and/or medical monitoring device an application that causes the smartphone and/or fitness tracker and/or medical monitoring device to send suitable signals to the vehicle that are indicative of the occupant's level of awareness.

In a nonlimiting example, the smartphone of an occupant who may be required to take control of the vehicle may be paired to the vehicle processing system, and the smartphone may include functionality to periodically detect a number of touchscreen presses and/or strokes over a suitable time interval, e.g., 1 minute, 2 minutes, 5 minutes, etc. Such smart phone activity may be communicated to the vehicle processing system, or to the processing system of the smartphone itself, and the activity data may be processed to determine if the number of touchscreen presses and/or strokes exceeds a threshold value, which may be indicative of insufficient attentiveness of the occupant. What amount of smartphone activity may constitute a threshold level inattentiveness requiring an alert may depend on the autonomy level of the vehicle, road conditions, environmental conditions, traffic conditions, and the like, and the vehicle processing system or smart phone processing system may receive real-time information about such factors pertinent to the vehicle's present location for determining suitable threshold levels dynamically. Suitable threshold values may be determined through suitable controlled testing based on such conditions, real world accident data, government regulation, and the like. As another nonlimiting example, if an occupant is wearing a fitness tracker or monitoring device that is configured to monitor heart rate and is paired to the occupant's smartphone, the vehicle can monitor the occupant's heart rate via appropriate signaling between the fitness tracker, the smartphone, and the vehicle. Based upon the value of the occupant's heart rate and/or changes in the occupant's heart rate, the vehicle can detect a physical problem with the occupant and can generate an alert, and optionally can cause the vehicle to stop and/or to signal a third party (such as to call 911) for assistance. In other examples, the vehicle can prompt a driver to complete a task to prove alertness, such as to touch certain portions of a touch screen of the vehicle to generate a signal indicative of the occupant's level of alertness. Based upon any suitable combination of one or more signals that the vehicle receives and comparison of such signals to respective threshold(s), the vehicle can detect whether the occupant is sufficiently alert and, if appropriate, can safely pull over and can call 911 or other third party for assistance.

FIG. 1 illustrates an exemplary framework for an approach of monitoring vehicle occupant awareness according to examples of the disclosure. Framework 100 includes vehicle 110 including monitoring and control system 120, and wireless device 130. Monitoring and control system 120 can be configured so as to wirelessly communicate with wireless device 130 and to control vehicle 110 based thereon. Wireless device 130 can include smartphone 130' and/or fitness tracker/monitor 130" from which monitoring and control system 120 can receive signals indicative of the occupant's level of awareness, and can take appropriate actions based upon such signals such as described in greater detail herein. In some configurations, the vehicle is an autonomous vehicle, such as a level 4 or level 5 autonomous vehicle. However, it should be appreciated that the present systems and methods suitably can be used in any type of vehicle, including level 0 vehicles, level 1 vehicles, level 2 vehicles, level 3 vehicles, level 4 vehicles, and/or level 5 vehicles, as well as vehicles that use different categories of automation, are fully non-automated, or have any suitable level of automation. An autonomous vehicle can be configured with an array of sensors, including LIDAR (light detection and ranging) and camera systems 113 for acquiring real-time video imagery of obstacles and other vehicles, GPS (global positioning system) 114, wireless communication systems for sending and receiving communications regarding road information and traffic in real-time, as well as a computer for applying driving rules and making driving decisions based on data and information acquired from the foregoing, in a suitable manner such as conventionally known in the art. Moreover, the functionality described herein may be combined with conventional DMSs to provide multiple modes of monitoring and detection simultaneously, such as monitoring eye movement, head position and movement, and the like, along with monitoring occupant awareness using one or more wireless devices proximate (e.g., held by, supported by, worn by, connected to, etc.) the vehicle occupant as described herein.

In the example illustrated in FIG. 1, monitoring and control system 120 includes processing system 121, e.g., one or more central processing units (CPUs) and one or memories utilized by processing system 121, such as random access memory (RAM) 122, random online memory (ROM) 123, and/or nonvolatile memory 124, as well as interfaces 125 via which the vehicle can communicate with the occupant, wireless device 130, and/or a third party. Nonvolatile memory 124 can include program instructions configured to cause processing system 121 to perform one or more operations such as provided herein. For example, nonvolatile memory 124 can include program instructions for occupant monitoring configured to cause processing system 121 to monitor the respective level of awareness of one or more occupants of vehicle 110 via signals received using one or more of interfaces 125, and program instructions for control configured to take one or more actions, such as generating an alert via one or more of interfaces 125 based upon the occupant monitoring upon determining that the occupant(s) level of awareness triggers a threshold as insufficient for the vehicle to operate safely.

In the exemplary configuration illustrated in FIG. 1, monitoring and control system 120 includes wireless transceiver 126 and optional touch screen 128. Wireless transceiver 126 can be configured to connect to wireless device 130 of the vehicle occupant, e.g., smartphone 130' held by the occupant and/or fitness tracker/monitoring device 130" worn by the occupant, and to receive a signal from the wireless device indicative of occupant activity which may be used to calculate a level of awareness of the vehicle occupant. Monitoring and control system 120 can be configured to determine whether the level of awareness of the vehicle occupant triggers, e.g., falls above or below, a threshold. For example, wireless transceiver 126 can include a cellular transceiver configured to provide communication between the vehicle 110 and wireless device 130 of the intended passenger via a cellular connection. Wireless transceiver 126 may also include a Bluetooth transceiver configured to permit communication with the wireless device 130 via a Bluetooth connection, and/or a Wi-Fi transceiver configured to permit communication with wireless device 130 via a Wi-Fi connection. In certain configurations in which wireless device 130 includes smartphone 130', wireless transceiver 126 can be configured so as to receive a signal including a value indicative of motion of the smartphone. For example, smartphone 130' can include accelerometer 131' configured to generate one or more value(s) based upon physical movement of the smartphone, e.g., responsive to the occupant's handling of the smartphone (whether in the occupant's hand, in the occupant's pocket, or otherwise in sufficient contact with the occupant as to be moved in response to the occupant's movement). As another example, wireless transceiver can be configured so as to receive a value indicative of the occupant's usage of the smartphone. In a nonlimiting example, the smartphone 130' of an occupant who may be required to take control of the vehicle may be paired to the vehicle processing system 121 via transceiver 126, and the smartphone 130' may include functionality to periodically detect a number of touchscreen presses and/or strokes over a suitable time interval, e.g., 1 minute, 2 minutes, 5 minutes, etc. Such smart phone activity may be communicated to the vehicle processing system 121, or to the processing system of the smartphone itself, and the activity data may be processed to determine if the number of touchscreen presses and/or strokes exceeds a threshold value, which may be indicative of insufficient attentiveness of the occupant. What amount of smartphone activity may constitute a threshold level inattentiveness requiring an alert may depend on the autonomy level of the vehicle, road conditions, environmental conditions, traffic conditions, and the like, and the vehicle processing system 121 or smart phone processing system may receive real-time information wirelessly about such factors pertinent to the vehicle's present location from a backend vehicle monitoring and control system or other information sources (e.g., any suitable online information source for location-based traffic, weather, road conditions, and other information) for determining suitable threshold levels dynamically. Suitable threshold values may be determined in advance based on through suitable controlled testing based on such conditions, real world accident data, government regulation, and the like, and the vehicle processing system 121 or smartphone 130' processing system may set a given threshold level based upon what conditions the vehicle is experiencing at the time at a given location. In examples, smartphone 130' can include usage monitor 132' configured to generate one or more value(s) based upon the occupant's use of electronic features of the smartphone (e.g., based upon a CPU usage of the smartphone, a memory usage of the smartphone, a number of applications being utilized on the smartphone, or the like).

Additionally, or alternatively, wireless device 130 can include a fitness monitor 130" and/or other monitoring device such as a medical device worn by the occupant, and wireless transceiver 126 can be configured so as to receive signal(s) from fitness monitor 130" including value(s) indicative of the occupant's level of awareness. For example, wireless transceiver 126 can be configured so as to connect directly to fitness monitor 130" and receive the signal(s), or can be configured so as to connect to smartphone 130' which is in wireless communication with fitness monitor 130" and to receive signals from fitness monitor 130" via smartphone 130'. The signal that wireless transceiver 126 receives from fitness monitor 130" (whether directly or indirectly via smartphone 130") can include any suitable biometric, such as a value indicative of the occupant's heart rate, blood oxygen level, or blood glucose level. For example, fitness monitor 130" can include one or more of a heart rate monitor configured so as to monitor the occupant's heart rate and to generate a value 131" indicative of such heart rate (64 beats per minute (BPM) in the illustrated, nonlimiting example); a blood glucose monitor configured so as to monitor the occupant's blood glucose level and to generate a value 132" indicative of such blood glucose level (5.5 mmol/L in the illustrated, nonlimiting example); and/or a blood oxygen monitor configured so as to monitor the occupant's blood oxygen level and to generate a value 133" indicative of such blood oxygen level (98% $SpO_2$ in the illustrated, nonlimiting example). However, it should be appreciated that fitness monitor 130" can include any suitable type of monitor or combination of such monitors. Other exemplary monitors can include breathalyzers. Additionally, it should be appreciated that fitness monitor 130" can include accelerometer 134" which can operate similarly as accelerometer 131'. Wireless transceiver 126 can be configured so as to receive signal(s) from wireless device 130, e.g., smartphone 130' and/or fitness tracker 130", at any suitable times, e.g., continuously or periodically.

Vehicle 110 is configured so as to use the signal(s) received from the occupant's wireless device 130 so as to monitor the awareness of the occupant, and more specifically to use the value(s) that are carried in such signals and are indicative of the occupant's level of awareness, so as to monitor the awareness of the occupant. For example, program instructions for occupant monitoring can be stored in nonvolatile memory 124 and can be configured so as to cause processing system 121 to obtain from wireless transceiver 126 the value(s) carried by the signal(s) from wireless device 130 and to assess the occupant's level of awareness based on such value(s). For example, for each type of value that wireless transceiver 126 potentially may receive from wireless device 130, ROM 123 and/or nonvolatile memory 124 can store one or more threshold values to which the received value(s) can be compared so as to quantify the occupant's level of awareness. For example, occupant monitoring program instructions can cause processing system 121 to obtain the received value(s) from wireless transceiver 126 and to obtain the respective threshold value(s) from ROM 123 or nonvolatile memory 124, and to compare the received value(s) to the respective threshold value(s) to determine whether the received values are within a range indicative of an acceptable level of awareness or are within a range indicative of an unacceptable level of awareness.

As one example, a threshold value for motion of the wireless device can correspond to a minimum amount of physical motion that would be expected of an occupant who is sufficiently aware, e.g., motion corresponding to the occupant breathing and/or moving their muscles slightly even if sitting still. Occupant monitoring program instructions can cause processing system 121 to compare the value received from smartphone 130' or fitness tracker 130" to such a threshold so as to quantify whether the occupant is moving at least that minimum amount and thus is sufficiently aware (e.g., to take control of the vehicle if needed, based upon that vehicle's level of autonomy). As another example, a threshold value for usage of the wireless device can correspond to a minimum amount of electronic activity that would be expected of an occupant who is sufficiently aware, e.g., activity corresponding to the occupant periodically checking their smartphone for messages or responding to messages within a specified period of time. Occupant monitoring program instructions can cause processing system 121 to compare the value received from smartphone 130' to such a threshold so as to quantify whether the occupant is using the wireless device at least that minimum amount and thus is sufficiently aware.

As still another example, threshold value(s) for heart rate can correspond to one or more of a minimum heart rate that would be expected of an occupant who is sufficiently aware, a maximum heart rate that would be expected of an occupant who is sufficiently aware, and/or a maximum change in heart rate (e.g., increasing or decreasing) that would be expected of an occupant who is sufficiently aware. Occupant monitoring program instructions can cause processing system 121 to compare the value received from fitness tracker 130" to such threshold(s) so as to quantify whether the occupant's heart rate and/or changes to such heart rate have a value that would be expected of an occupant who is sufficiently aware. As yet another example, threshold value(s) for blood sugar can correspond to one or more of a minimum blood sugar that would be expected of an occupant who is sufficiently aware, a maximum blood sugar that would be expected of an occupant who is sufficiently aware, and/or a maximum change in blood sugar (e.g., increasing or decreasing) that would be expected of an occupant who is sufficiently aware. Occupant monitoring program instructions can cause processing system 121 to compare the value received from fitness tracker 130" to such a threshold so as to quantify whether the occupant's blood sugar and/or changes to such blood sugar have a value that would be expected of an occupant who is sufficiently aware.

As a further example, threshold value(s) for blood oxygen level can correspond to one or more of a minimum blood oxygen level that would be expected of an occupant who is sufficiently aware, and/or a maximum change in blood oxygen level (e.g., decreasing) that would be expected of an occupant who is sufficiently aware. Occupant monitoring program instructions can be configured so as to cause processing system 121 to compare the value received from fitness tracker 130" to such a threshold so as to quantify whether the occupant's blood oxygen level and/or changes to such blood oxygen level have a value that would be expected of an occupant who is sufficiently aware. Other thresholds and values suitably can be established, obtained, and compared so as to quantify whether the occupant is sufficiently aware. For example, occupant monitoring program instructions can cause processing system 121 to prompt a user to complete a task using touch screen 128, and to compare the user's ability to complete such task to a suitable threshold so as to quantify whether the user's task-completion ability has a value that would be expected of an occupant who is sufficiently aware.

Referring still to FIG. 1, the monitoring and control system 120 can be configured to cause an alert activation interface 127 to generate a visible alert, sound, or vibration inside the vehicle based upon the level of awareness of the vehicle occupant being below a threshold, or to cause wireless transceiver 126 to send an alert signal, e.g., to the occupant's wireless device and/or a third party, such as a 911 operator. For example, in response to an occupant monitoring determination that the level of awareness of the vehicle occupant triggers a threshold, e.g., is below an attentiveness threshold or above an inattentiveness threshold, e.g., based upon the value(s) received from wireless device 130 and the corresponding threshold(s), the monitoring and control system 120 can be configured so as to cause processing system 121 to control vehicle 110 to respond appropriately. For example, the monitoring and control system 120 can be configured so as to cause processing system 121 to generate any suitable alert or combination of alert signals to be communicated by interface 125 by wireless transceiver 126 to the vehicle occupant and/or a third party, e.g. a 911 operator. Additionally, for example, monitoring and control system 120 can be configured to cause the alert activation interface 127 to generate a visible alert responsive to a signal from processing system 121; such visible alert can include, but is not limited to, colorful or flashing lights and/or a message projected on the instrument panel and/or heads-up display (not specifically illustrated) or on touch screen 128. In this regard, the alert activation interface 127 may comprise one or more integrated circuits, transistor circuitry and switching circuitry so as to control suitable indicators based on receipt of an alert signal(s) such as from the processing system 121. For example, processing system 121 may send a suitable alert signal to alert activation interface 127 to trigger, e.g., an audible alert including, but not limited to, alarm tones and/or a message generated by vehicle speakers (not specifically illustrated). As another example, alert activation interface 127 can be configured to trigger a vibration responsive to a signal from processing system 121; such vibration can include, but is not limited to, vibrations generated by the vehicle's seat and/or steering wheel (not specifically illustrated) via suitable vibration actuators. Additionally, or alternatively, processing system 121 can cause the wireless transceiver 126 to send a signal to the occupant's wireless device (e.g., smart phone, so as to cause a visible, audible or vibratory indication at that device) or to a third party. For example, a message can be sent to a third party, such as 911 or other emergency assistance service, responsive to such signals. As a further or alternative option, monitoring and control system 120 can be configured so as to bring the vehicle 110 to a safe, controlled stop based upon the level of awareness of the vehicle occupant triggering a threshold.

FIG. 2 illustrates a flow chart of an exemplary approach of monitoring vehicle occupant awareness according to examples of the disclosure. It should be appreciated that although method 200 illustrated in FIG. 2 are described with reference to framework 100 illustrated in FIG. 1, such operations suitably can be used with any appropriate combination of hardware and software, e.g., any non-autonomous or autonomous vehicle, such as a level 3, 4 or 5 autonomous vehicle. The occupant can be a driver of the vehicle or a non-driving passenger in the vehicle (noting that in level 5 autonomous vehicles, the driver can be a non-driving passenger).

Method 200 illustrated in FIG. 2 includes at step 202 connecting, by a vehicle, to a wireless device of the vehicle occupant. For example, vehicle 110 illustrated in FIG. 1 can be configured so as to periodically or continuously connect to wireless device 130 via wireless transceiver 126, e.g., via a Bluetooth, cellular, and/or Wi-Fi connection. Wireless device 130 can include smartphone 130' held by the occupant and/or a fitness monitor worn by the occupant.

Referring again to FIG. 2, method 200 can include at step 204 receiving, by the vehicle, a signal from the wireless device indicative of activity of the vehicle occupant and processing the signal to determine a level of awareness of the vehicle occupant. In a manner such as described with reference to FIG. 1, the signal from the wireless device can include a value indicative of motion of the smartphone or fitness tracker/monitoring device, a value indicative of the occupant's usage of the smartphone, a value indicative of the occupant's heart rate, blood oxygen level, or blood glucose level, or any other suitable type of value.

Referring again to FIG. 2, method 200 also can include at step 206 generating, by the vehicle, an alert based upon the level of awareness of the vehicle occupant being below a threshold. For example, processing system 121 can determine whether the vehicle occupant is sufficiently aware to operate the vehicle based on the received value(s) and stored threshold values, and, based upon the vehicle occupant being insufficiently aware, to send a suitable signal to alert module 127 to generate an alert. As described with reference to FIG. 1, the alert can include a light or message, sound, or vibration inside the vehicle and/or can include a signal sent to a third party or signal sent to the occupant's wireless device to render a visual, audible, and/or vibratory indication at that device. As a further option, the vehicle can be controlled by autonomous functionality to bring itself to a safe, controlled stop based upon the level of awareness of the vehicle occupant triggering the threshold, e.g., using sensors such as vehicle LIDAR and cameras 113 and GPS 114 that gather and receive information that is then processed by the vehicle control system to control the drive system and steering system via suitable actuators.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present invention has been described in terms of exemplary embodiments, it will be understood by those skilled in the art that various modifications can be made thereto without departing from the scope of the invention as set forth in the claims.

What is claimed is:

1. A method of monitoring awareness of a vehicle occupant, the method comprising:
   connecting, by the vehicle, to a wireless device of the vehicle occupant;
   receiving, by the vehicle, a signal from the wireless device indicative of at least one characteristic chosen from attentiveness and activity of the vehicle occupant and processing the signal to determine a level of at least one attribute chosen from attentiveness and awareness of the vehicle occupant;
   determining whether the level of the at least attribute chosen from attentiveness and awareness of the vehicle occupant satisfies a threshold; and
   generating, by the vehicle, an alert based upon whether the level of at least one attribute chosen from attentiveness and awareness of the vehicle occupant satisfies the threshold.

2. The method of claim 1, wherein the vehicle is a level 3, 4 or 5 autonomous vehicle.

3. The method of claim 1, wherein the wireless device comprises a smartphone proximate the occupant.

4. The method of claim 3, wherein the signal from the wireless device comprises a value indicative of motion of the smartphone.

5. The method of claim 3, wherein the signal from the wireless device comprises a value indicative of the occupant's usage of the smartphone.

6. The method of claim 1, wherein the wireless device comprises a fitness monitor worn by the occupant.

7. The method of claim 6, wherein the signal from the wireless device comprises a value indicative of the occupant's heart rate, blood oxygen level, or blood glucose level.

8. The method of claim 1, wherein the alert comprises a visible alert, a sound alert, or a vibration alert inside the vehicle.

9. The method of claim 1, wherein the alert comprises a signal sent to a third party.

10. The method of claim 1, further comprising autonomously stopping the vehicle based upon whether the level of awareness of the vehicle occupant satisfies the threshold.

11. A system for monitoring awareness of a vehicle occupant, the system comprising:
    a wireless transceiver of a vehicle configured to connect to a wireless device of a vehicle occupant and to receive a signal from the wireless device indicative of at least one characteristic chosen from attentiveness and activity of the vehicle occupant;
    a computer processing system configured to process data of the vehicle occupant and determine whether a level of at least one attribute chosen from attentiveness and awareness of the vehicle occupant based on the processed data satisfies a threshold; and an electrical interface configured to receive a first alert signal based on the determination of whether the level of the at least one attribute chosen from attentiveness and awareness of the vehicle occupant satisfies the threshold, the electrical interface configured to control an alert.

12. The system of claim 11, wherein the vehicle is a level 3, 4 or 5 autonomous vehicle.

13. The system of claim 11, wherein the wireless device comprises a smartphone proximate the occupant.

14. The system of claim 13, wherein the signal from the wireless device comprises a value indicative of the smartphone.

15. The system of claim 13, wherein the signal from the wireless device comprises a value indicative of the occupant's usage of the smartphone.

16. The system of claim 11, wherein the wireless device comprises a fitness monitor worn by the occupant.

17. The system of claim 16, wherein the signal from the wireless device comprises a value indicative of the occupant's heart rate, blood oxygen level, or blood glucose level.

18. The system of claim 11, wherein the electrical interface comprises circuitry configured to control a visible alert, a sound alert, or a vibration alert inside the vehicle.

19. The system of claim 11, wherein the electrical interface comprises a transceiver configured to send a signal to a third party.

20. The system of claim 11, wherein the computer processing system is configured to initiate a controlled stop of the vehicle based upon whether the level of awareness of the vehicle occupant satisfies the threshold.

* * * * *